Aug. 1, 1961 W. E. HOWALD 2,994,508
LIGHTWEIGHT COMPRESSOR HOUSING CONSTRUCTION
Filed March 4, 1958 2 Sheets-Sheet 1

INVENTOR.
WERNER E. HOWALD
BY
ATTORNEY

INVENTOR.
WERNER E. HOWALD
BY
ATTORNEY

United States Patent Office 2,994,508
Patented Aug. 1, 1961

2,994,508
LIGHTWEIGHT COMPRESSOR HOUSING CONSTRUCTION
Werner E. Howald, Ridgewood, N.J., assignor to Curtiss-Wright Corporation, a corporation of Delaware
Filed Mar. 4, 1958, Ser. No. 719,161
5 Claims. (Cl. 253—78)

This invention relates to gas turbines and is particularly directed to the stator construction for the compressors and/or turbines of such engines. For convenience the invention will be described in connection with an air compressor for an aircraft gas turbine engine. As will be apparent, however, the invention is not so limited and instead is also applicable to other elastic fluid apparatus as for example gas turbines.

As aircraft turbo-jet gas turbine engines are designed for higher and higher air flows into the engine increasingly large diameters become necessary. If the compressor stator housing a turbo-jet engine is made of a casting the resulting stator will be substantially heavier than that required by strength considerations alone because of the minimum metal thickness required by a casting. An object of the present invention comprises the provision of a novel, strong and lightweight stator construction for an air or other elastic fluid compressor. In accordance with the invention the air compressor stator comprises a novel sheet metal housing shell with longitudinal and circumferential ribs to prevent local buckling of the sheet metal housing.

Other objects of the invention will become apparent upon reading the annexed detailed description in connection with the drawing in which.

Figure 1:
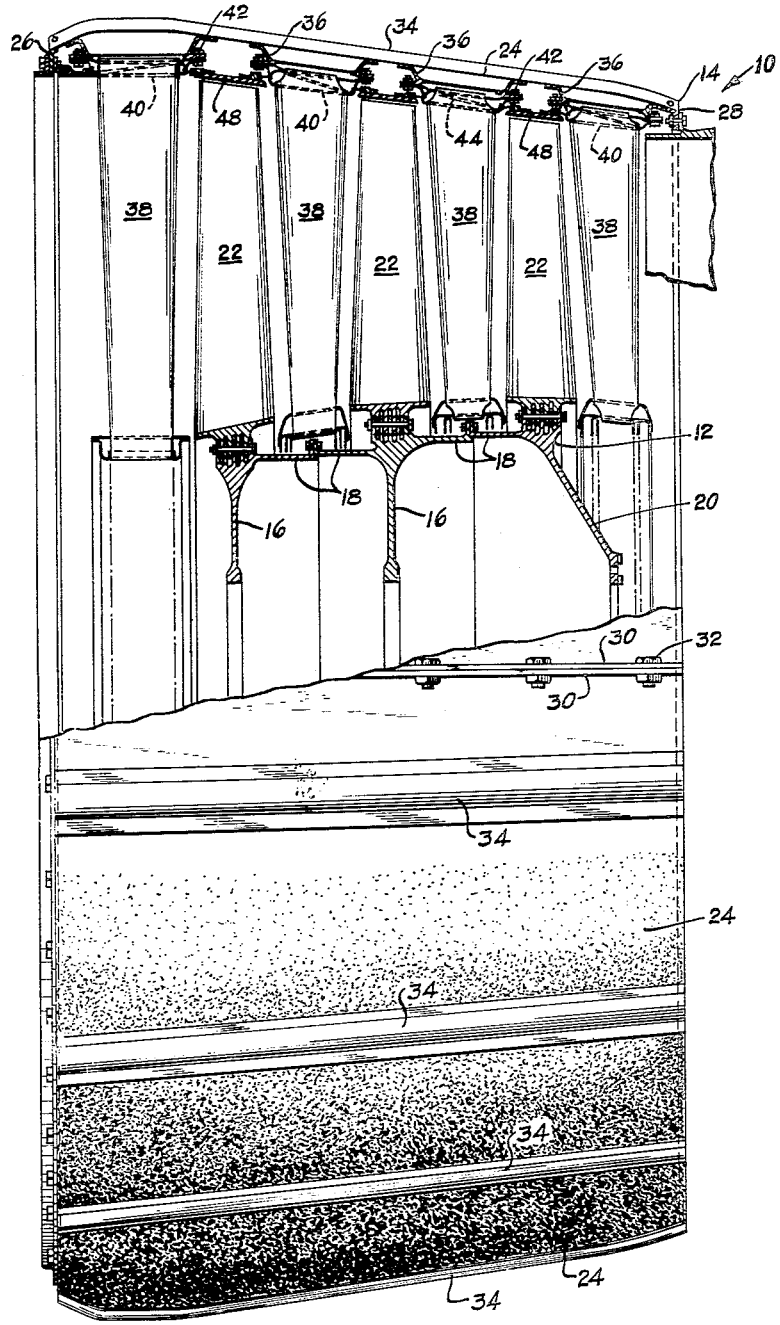
FIG. 1 is a view partly in axial section illustrating an axial flow air compressor embodying the invention.
Figure 2:
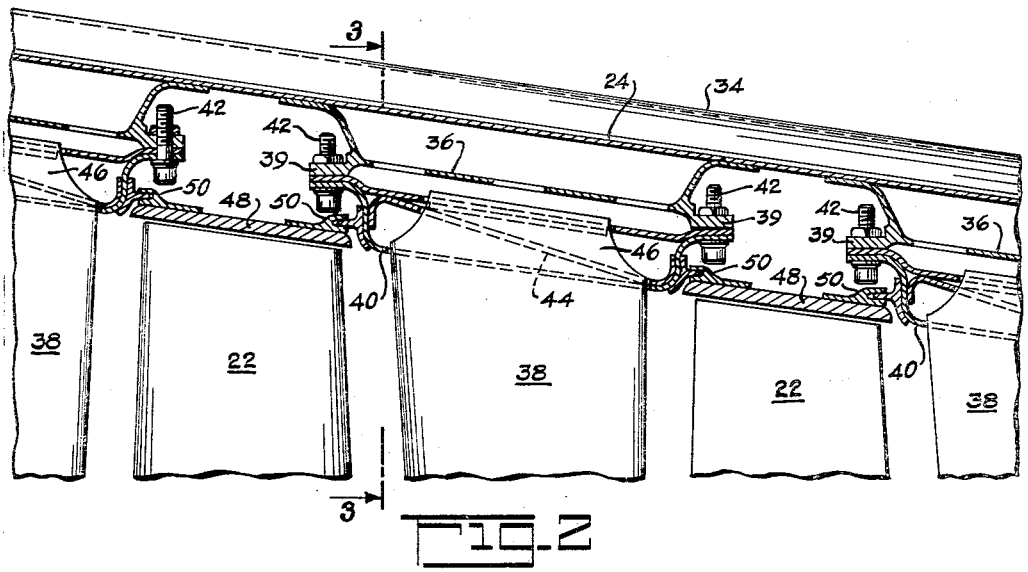
FIG. 2 is an enlarged view of a portion of FIG. 1.
Figure 3:
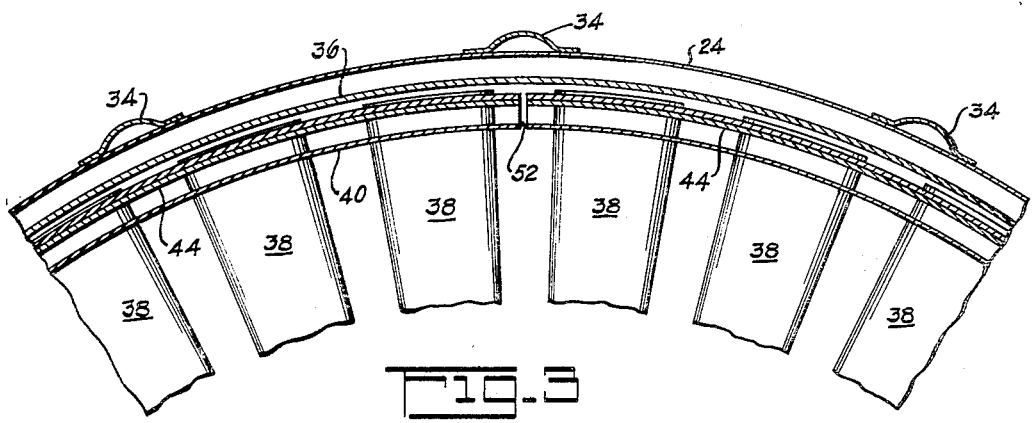
FIG. 3 is a sectional view taken along line 3—3 of FIG. 2.

Referring to the drawing, a compressor assembly is illustrated at 10, as comprising a compressor rotor assembly 12 mounted within a housing and stator blade assembly 14. As illustrated, the rotor assembly 12 includes a plurality of rotor discs 16 (three being illustrated) having flanges 18 extending axially toward each other and being drivably secured together to form a composite rotor drum. In addition, one end rotor disc 16 has an inwardly extending flange 20 for connection of a drive shaft thereto. A plurality of circumferentially-spaced stages of blades 22 are secured to each of the rotor discs 16 thereby forming a multi-stage compressor rotor. The aforedescribed details of the compressor rotor assembly 12 form no part of the present invention.

The compressor housing and stator blade assembly 14 comprises two semi-cylindrical halves of conical form. Each semi-cylindrical housing half consists of a one-piece semi-cylindrical sheet metal shell 24 having semi-circular forged flanges 26 and 28 welded to the semi-circular axially-spaced edges of said shell and forged flanges 30 welded to the two ends of said semi-cylindrical shell. The end flanges 30 of the two housing halves are secured together by bolts 32 to form a complete cylindrical housing.

Each semi-cylindrical sheet metal shell half 24 preferably has a plurality of circumferentially-spaced stiffening ribs 34 welded to the outer surface of said shell and extending longitudinally along the shell. Each rib 34 is of sheet metal construction and has a channel-shaped cross-section with the open side of said cross-section facing its shell half 24. Each shell half 24 also has a plurality of axially-spaced semi-circular ribs 36 secured to the inner surface of said shell half between its end flanges 26 and 28. The axially-spaced ribs 36 function as stiffeners to maintain the roundness of the housing and as illustrated there is one such rib 36 for each stage of stator blades 38 carried by the stator assembly 14. The stages of stator blades 38 are disposed between the axially spaced stages of rotor blades 22 so as to alternate therewith. The stiffener ribs 36 have portions 39 the radially inner surfaces of which are finished to the desired diameter, for example, by a simple machining operation.

A plurality of shroud ring segments 40 are disposed in end-to-end relation and are secured against the internally finished surfaces of the portions 39 of the stiffener ribs 36 as by bolts 42 so that they can be readily disconnected from said ribs. Each shroud ring segment 40 preferably has a hollow sheet metal construction of rectangular cross-section and has a diagonal reinforcing strip 44 with the edges of said strip secured to opposite corners of the rectangular cross-section of the shroud.

A plurality of stator blades 38 are secured to and extend radially inwardly from each shroud ring segment 40. For this purpose each shroud ring segment has a plurality of openings therethrough to receive the root ends 46 of the stator blades 38. The stator blade root ends 46 are secured to the shroud ring segments as by brazing.

The spaces between the shroud ring segments for adjacent stator blade stages are covered with shroud ring members 48 so that the shroud ring segments 40 and the members 48 together form a substantially continuous outer surface for the flow path of the compressor air. Each shroud member 48 is supported from the adjacent shroud ring segments by tongue and groove connections indicated at 50. The shroud members 48 overlie the tip ends of the rotor blades 22.

With the structure described the blades of the stator assembly may readily be replaced without dismantling the entire compressor structure, both stator and rotor. Thus, to replace a damaged stator blade, the two halves of the stator shell are disconnected at their flanges 30. The shell half with the damaged blade is removed and the shroud members 48 on opposite sides of the damaged blade are slid out along their tongue and groove connections 50 at least to an extent sufficient to expose the bolts 42 securing the shroud ring segment 40 containing the damaged blade. These bolts 42 are removed and said shroud ring segment 40 with its blades 38 is removed and replaced with a new blade segment 40. Each shroud ring segment 40 is sufficiently short to permit its removal without requiring the removal of adjacent shroud ring segments of its stator blade stage. The positions of the junctions or gaps 52 between adjacent shroud ring segments of a particular stator blade stage are preferably staggered from stage to stage.

By taking advantage of the strength of the stiffeners 34 and 36 the thickness of the cylindrical wall of the compressor housing, as provided by the two semi-cylindrical shells 24, can be made as little as 0.02 inch. With but this thickness, the shell 24 is able to withstand the maximum internal pressures of the compressor. Notwithstanding this thin wall structure the stiffeners 34 and 36 enable the compressor housing to withstand the bending loads imposed on the housing as a result of extreme aircraft maneuvering and to withstand local bending loads caused by the gas pressure loads on the stator blades 38.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A housing and stator blade assembly for multi-stage axial flow compressors, turbines or similar apparatus having a plurality of axially spaced stages of stator blades alternating with stages of rotor blades; said assembly comprising a two-part housing having two semi-cylindrical halves detachably joined together to form a complete cylinder; each said housing half comprises a semi-cylindrical shell having a one-piece sheet-metal construction, a plurality of axially-spaced semi-circular stiffener ribs secured to and extending circumferentially along the inner surface of said shell, each of said ribs having a finished inner surface, a plurality of shroud ring segments for each said rib, means detachably carried by said ribs for securing said shroud ring segments to the finished inner surface of each of said ribs with the shroud ring segments of each rib being disposed in end-to-end relation on said rib, additional shroud means disposed between the axially-spaced stages of said shroud ring segments and detachably supported by the associated housing shell, said shroud ring segments and additional shroud means forming a substantially continuous outer boundary of the apparatus fluid with said additional shroud means covering the securing means for the shroud ring segments and being movable to provide access to said securing means to permit detachment of said shroud ring segments, and a plurality of stator blades secured to and extending radially inwardly from each of said shroud ring segments.

2. A housing and stator blade assembly as recited in claim 1 in which each of said stiffener ribs has a channel-shaped cross-section with its open side facing said shell.

3. A housing and stator blade assembly as recited in claim 1 in which each of said stiffener ribs has a channel-shaped cross-section with its open side facing said shell and in which each of said shroud ring segments has a hollow rectangular cross-section with a diagonal bracing member therein.

4. A housing and stator blade assembly as recited in claim 1 in which said shell is sheet metal and has a plurality of circumferentially-spaced stiffener ribs secured to and extending longitudinally along the exterior surface of each of said semi-cylindrical shells.

5. A housing and stator blade assembly as recited in claim 1 in which the support for said additional shroud means constitutes a tongue and groove connection with the adjacent shroud ring segments such that said additional shroud means can be moved along said tongue and groove connections to provide access to said securing means for the shroud ring segments.

References Cited in the file of this patent

UNITED STATES PATENTS

| | | |
|---|---|---|
| 2,722,373 | Ledwith et al. | Nov. 1, 1955 |
| 2,749,026 | Hasbrouck et al. | June 5, 1956 |
| 2,763,462 | McDowall et al. | Sept. 18, 1956 |